United States Patent
Humphrey et al.

(10) Patent No.: US 8,727,625 B2
(45) Date of Patent: May 20, 2014

(54) ROLLER GRILL BEARING APPARATUS

(75) Inventors: James E. Humphrey, Cheyenne, WY (US); Ryan James Coulter, Cheyenne, WY (US)

(73) Assignee: Standex International Corporation, Salem, NH (US)

( * ) Notice: Subject to any disclaimer, the term of this patent is extended or adjusted under 35 U.S.C. 154(b) by 53 days.

(21) Appl. No.: 13/447,236

(22) Filed: Apr. 15, 2012

(65) Prior Publication Data

US 2012/0263404 A1  Oct. 18, 2012

Related U.S. Application Data

(60) Provisional application No. 61/517,198, filed on Apr. 15, 2011.

(51) Int. Cl.
*F16C 33/20* (2006.01)
*A47J 37/06* (2006.01)

(52) U.S. Cl.
USPC ........... 384/276; 384/295; 384/419; 384/428; 99/441

(58) Field of Classification Search
USPC ............ 99/441, 427; 384/275, 276, 295–300, 384/416–419, 428, 438–444
See application file for complete search history.

(56) References Cited

U.S. PATENT DOCUMENTS

| | | | | |
|---|---|---|---|---|
| 2,185,979 A | * | 1/1940 | Dumas | 99/423 |
| 3,084,616 A | * | 4/1963 | Nissen et al. | 99/423 |
| 3,124,370 A | * | 3/1964 | Traugott | 280/86.756 |
| 3,193,335 A | * | 7/1965 | Wing | 384/296 |
| 3,472,156 A | * | 10/1969 | Bardeau | 99/423 |
| 4,494,883 A | * | 1/1985 | Winter | 384/439 |
| 5,129,740 A | * | 7/1992 | Matsushita et al. | 384/441 |
| 7,367,261 B2 | * | 5/2008 | Gaskill et al. | 99/339 |

* cited by examiner

*Primary Examiner* — Thomas R Hannon
(74) *Attorney, Agent, or Firm* — William B. Ritchie

(57) ABSTRACT

A roller grill bearing assembly that can be adapted to fit on any size roller grill or roller tubes. The bearing assembly substantially increases the bearing land on the roller grill housing and increases the bearing area over the land. The bearing assembly permits the bearing apparatus to be snapped in place on the stamped opening on a sheet metal side panel as done using current manufacturing methods. Further, the bearing assembly can be produced using current manufacturing techniques without significantly changing the cost of production. Most importantly, the invention substantially increases the life span of the bearing.

4 Claims, 8 Drawing Sheets

ROLLER GRILL BEARING APPARATUS

This application claims benefit of U.S. Provisional Application Ser. No. 66/517,198, filed Apr. 15, 2011, pursuant to 35 USC §119(e).

FIELD OF THE INVENTION

This invention relates to commercial cooking equipment, in particular, a bearing assembly for a roller grill for cooking hot dogs, bratwursts, sausages, and other food products having an elongated shape.

BACKGROUND OF THE INVENTION

The use of a roller grill to cook hot dogs dates back at least as early as 1939. At that time, Dumas, in U.S. Pat. No. 2,185,979, recognized the advantage of using a plurality of rollers to quickly and uniformly cook hot dogs or other similarly shaped foods. Since that time, the roller grill has been associated with America's food icon, the hot dog.

There have been numerous improvements to this device over the years where it has become a part of most commercial food service establishments, which serve large quantities of hot dogs or similarly shaped foods. Manufactures of such units spend a great of time and effort to instruct the purchasers and the equipment operators concerning safety and proper cleaning procedures. The roller grill has a plurality of cooking tubes that rotate by a drive mechanism with each roller tube anchored between opposing sides of the side panels. Each roller tube is fitted with a bearing so that it may turn freely. The present construction of this bearing mechanism is a plastic bearing that is snapped into an opening provided in a sheet metal panel. Cleaning instructions inform the operator to carefully clean each tube so that grease and particles do not get into the bearing that will substantially reduce the bearing's lifespan. Cleaning and the grease seals help prevent grease and debris from entering into the bearings and the drive mechanism which is the major source of early drive failure.

Further, operators are cautioned against using one or more roller tubes as "handles" for moving the grill or placing unusually heavy objects on the grill for storage when the grill is not in use. Present roller grill bearing surfaces are made from relatively soft plastic such as TEFLON polymer that can be easily cut by the sharp edges of the sheet metal opening if the bearing is forced out of alignment due to excessive force or accumulation of grease or dirt. TEFLON is the registered trademark of E.I. Du Pont, Wilmington, Del. for its polytetrafluoroethylene polymer.

There is not found in the prior art a roller grill bearing apparatus that substantially increases the surface area of the bearing, ensures that the bearing will not rotate when snapped in place; can concentrate the friction surface to a known location for better control of wearing, and, yet, can be easily manufactured and installed in a manner similar to present manufacturing techniques.

SUMMARY OF THE INVENTION

It is an aspect of the invention to provide a roller grill bearing assembly that can be adapted to fit on any size roller grill or roller tubes.

Another aspect of the invention is to provide a roller grill bearing assembly that substantially increases the bearing land on the roller grill housing and increases the bearing area over the land.

Still another aspect of the invention is to provide a roller grill bearing assembly that permits the bearing apparatus to be snapped in place on the stamped opening on a sheet metal side panel as done using current manufacturing methods.

Another aspect of the invention is to provide a roller grill bearing assembly that can be produced using current manufacturing techniques without significantly changing the cost of production.

Finally, it is an aspect of the invention to provide a roller grill bearing assembly that increases the life span of the bearing.

DETAILED DESCRIPTION OF THE INVENTION

Figure 11:
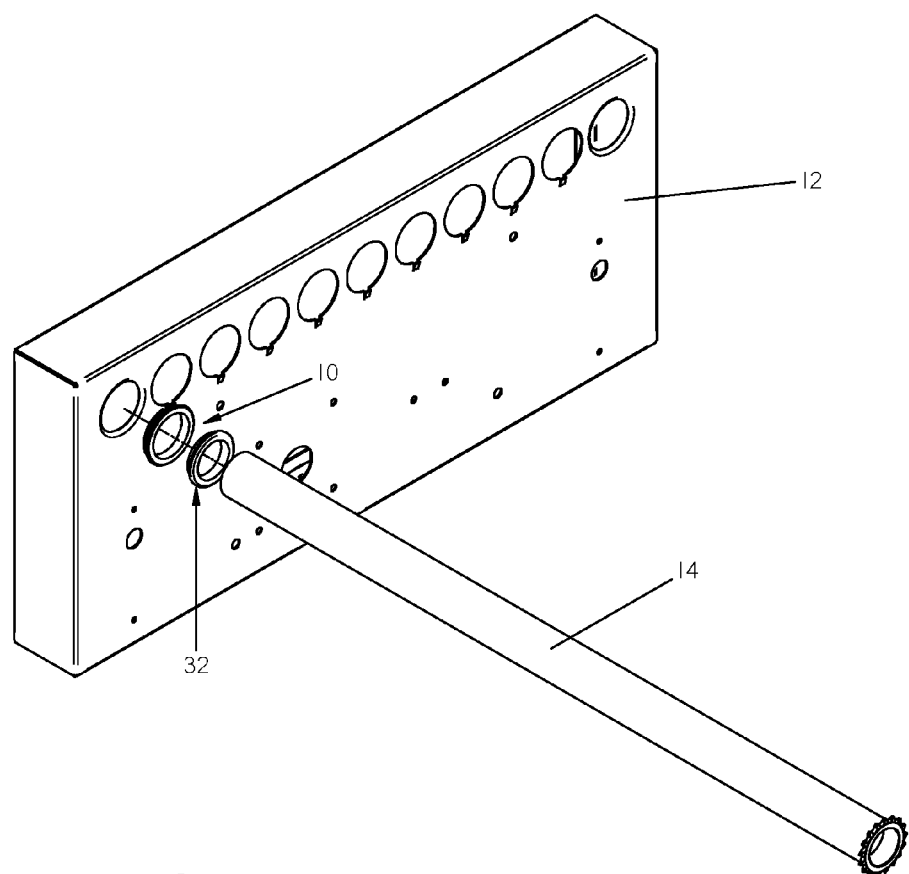
FIG. 11 is an isometric exploded view of the roller tube, bearing apparatus and left side panel in a typical grill.
Figures 12, 13:
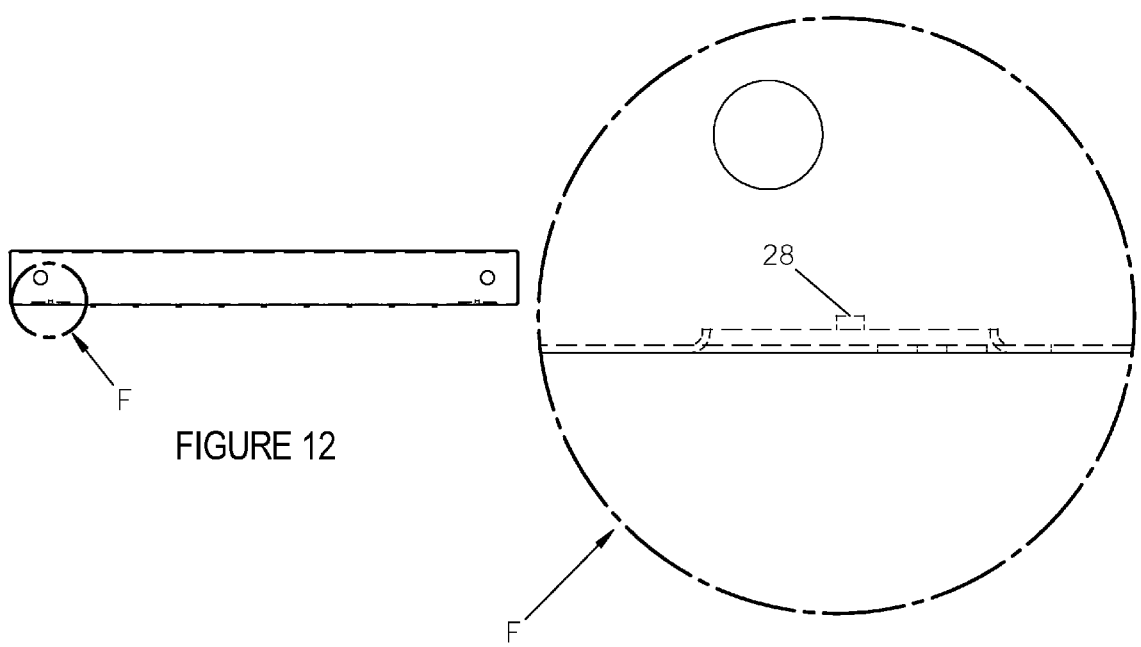
FIG. 12 is a top view of the side panel.
FIG. 13 is a detailed top view of the side panel in area F as shown in FIG. 12.

In order to better appreciate the merits of the invention, a more detailed understanding of the prior art will be undertaken. Referring now to FIGS. 1-5, a typical roller grill bearing is described. This bearing is usually made from bar stock and then machined to provide bearing 11. The bearing material is typically TEFLON polymer and/or filled TEFLON polymer. The left side 13 of bearing 11 is smaller than the right side 15 so that channel 19 is formed in which the sheet metal 16 of the side wall 12 will fit into. A hole is punched into the side wall 12 that corresponds to the diameter of the bearing. Typically, this hole is punched with a CNC fabricator. Anti-rotation lance 21 is made at the same time. Bearing land 17 typically ranges from (1.27 millimeters to 1.397 millimeters) 0.050 inches to 0.055 inches wide. Note that bearing notch 31 is provided such that once bearing 11 is snapped into place in the hole that has been punched in the sheet metal (See FIG. 11), bearing notch 31 is engaged by lance 21 to prevent bearing 11 from turning relative to roller 14. Grease seal 32 is provided to help keep the grease and food particles from entering bearing 11. Grease seal 32 is presently made from TEFLON polymer that is machined from a bar. The seal 32 is placed on a seal stretcher (not shown) and then allowed to shrink back to roller tube 14 diameter to seal tube 14 and bearing 11 from grease and food debris.

Since roller grills used commercially are subjected to particularly rough treatment such as picking the grill up by tubes 14, bearings 11 experience substantial adverse treatment. A typical life span of current bearings 11 is about five years but failures have occurred as early as 30 days due to improper handling. Sheet metal 16 is sharp and can cut through the relatively soft prior art bearing 11 rather quickly if tubes 14 are encountering additional stresses with improper handling as discussed above. Therefore, the inventors recognized that to improve the life span of roller grill bearings, since it was not possible to reduce the rough handling of typical users, it would be necessary to increase the bearing land size and eliminate cutting of the bearings due to sharp edge of sheet metal 16.

Figures 1, 2:
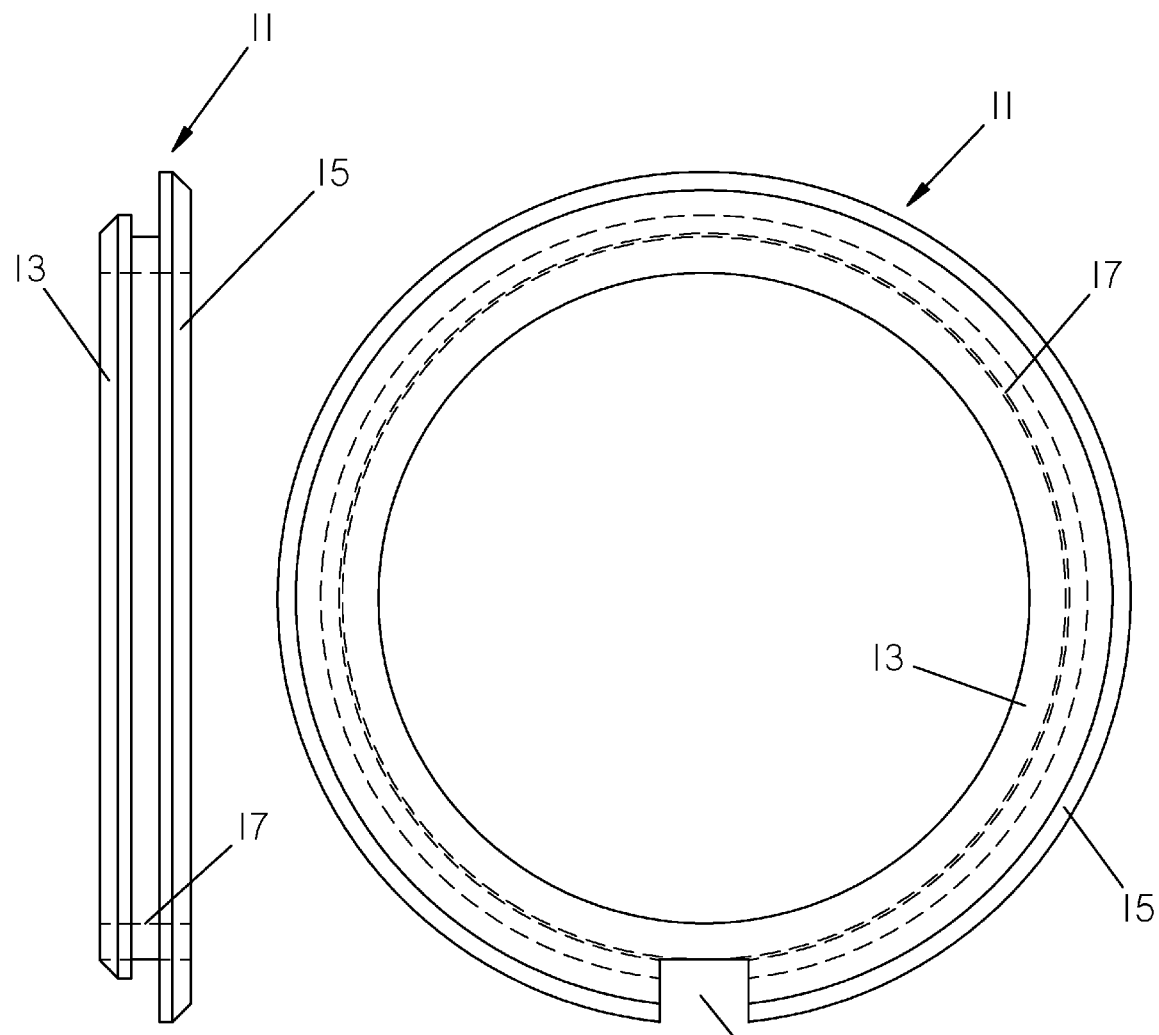
FIG. 1 is a side view of the prior art roller grill bearing apparatus.
FIG. 2 is a front view of the prior art roller grill bearing apparatus.
Figure 3:
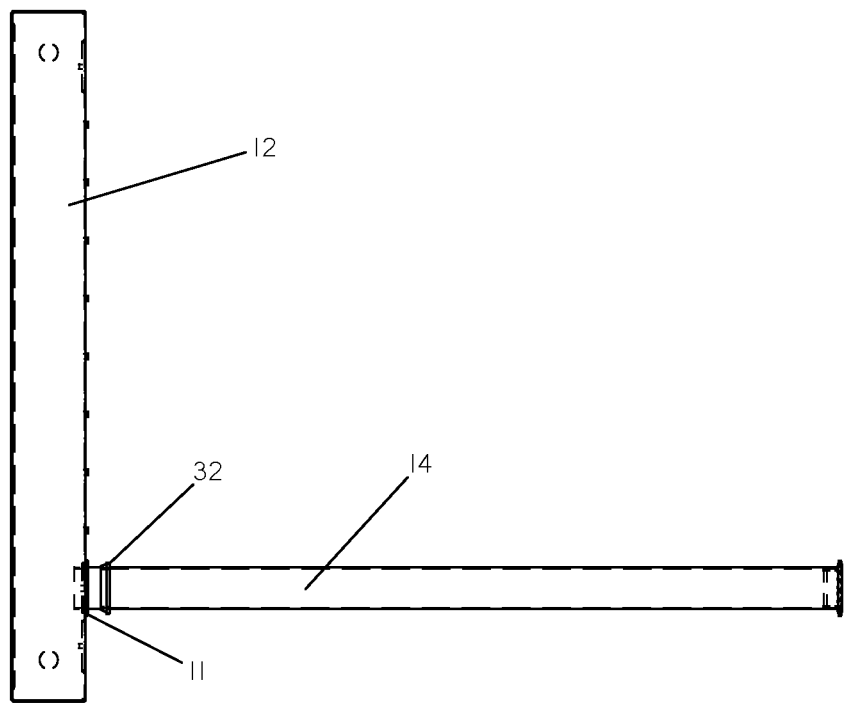
FIG. 3 is a top view of the prior art roller grill bearing apparatus in a grill showing the roller tube and the left side panel of the grill.
Figures 4, 5:
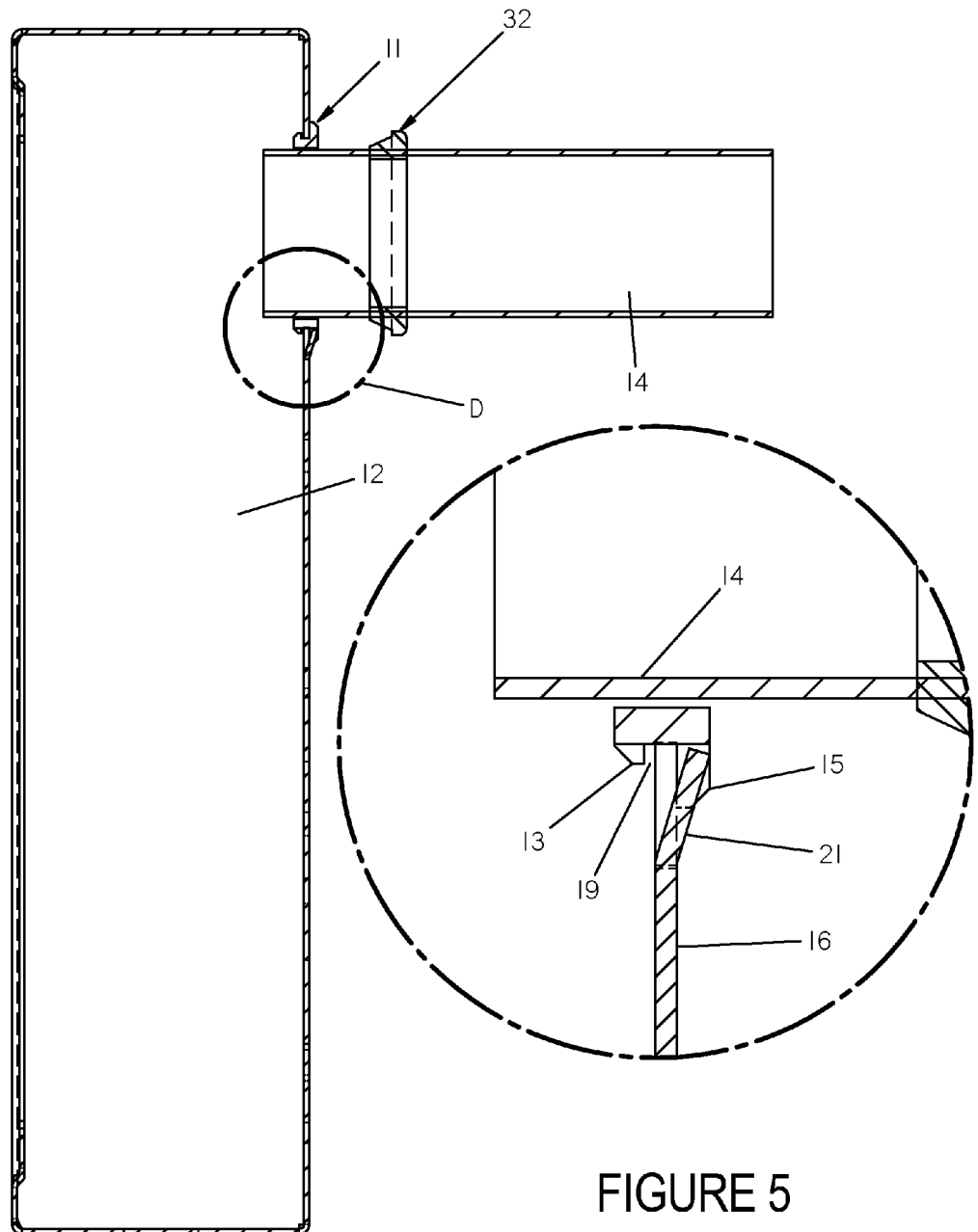
FIG. 4 is a top view of the prior art roller grill bearing apparatus shown along Section line A-A as shown in FIG. 3.
FIG. 5 is a detailed top view of the prior art roller grill bearing apparatus in area D shown in FIG. 4.
Figures 6, 7:
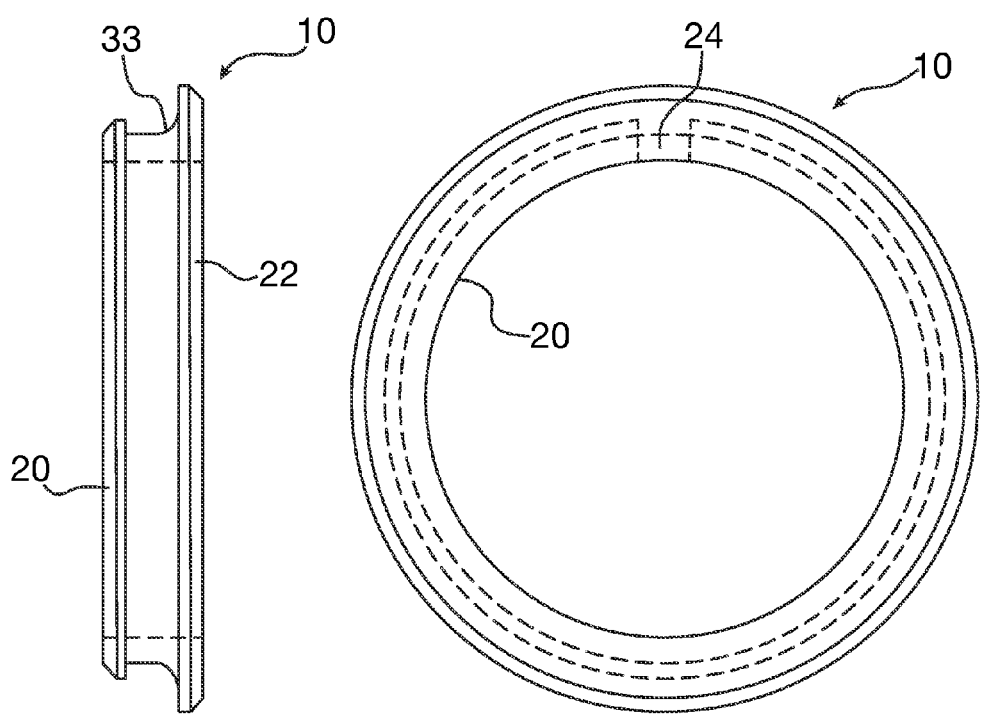
FIG. 6 is a side view of the roller grill bearing apparatus in accordance with the invention.
FIG. 7 is a front view of the roller grill bearing apparatus.
Figure 8:
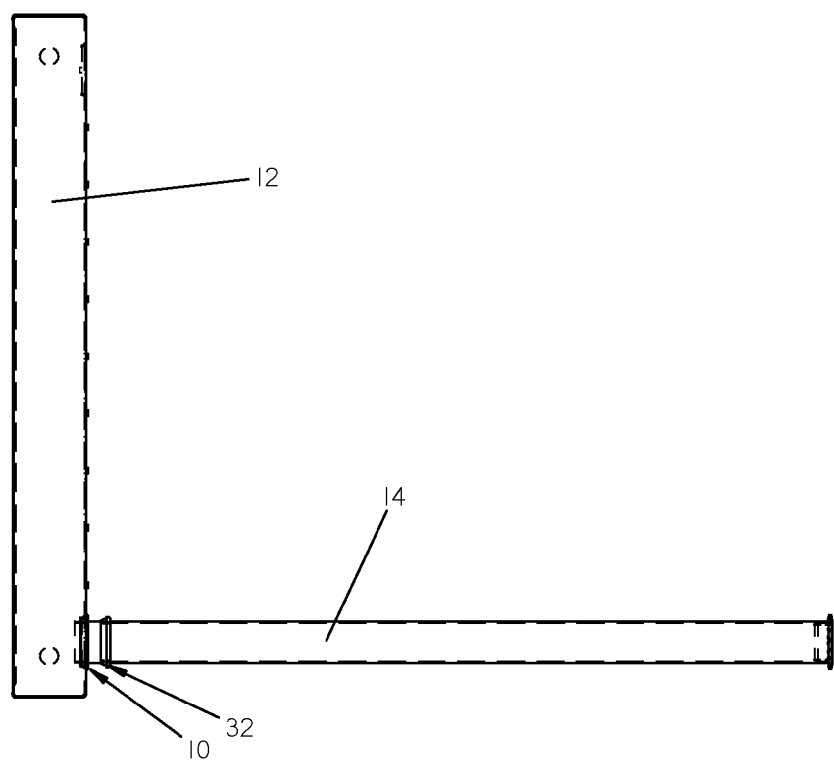
FIG. 8 is a top view of the roller grill bearing apparatus in a grill showing the roller tube and the left side panel of the grill.
Figures 9, 10:
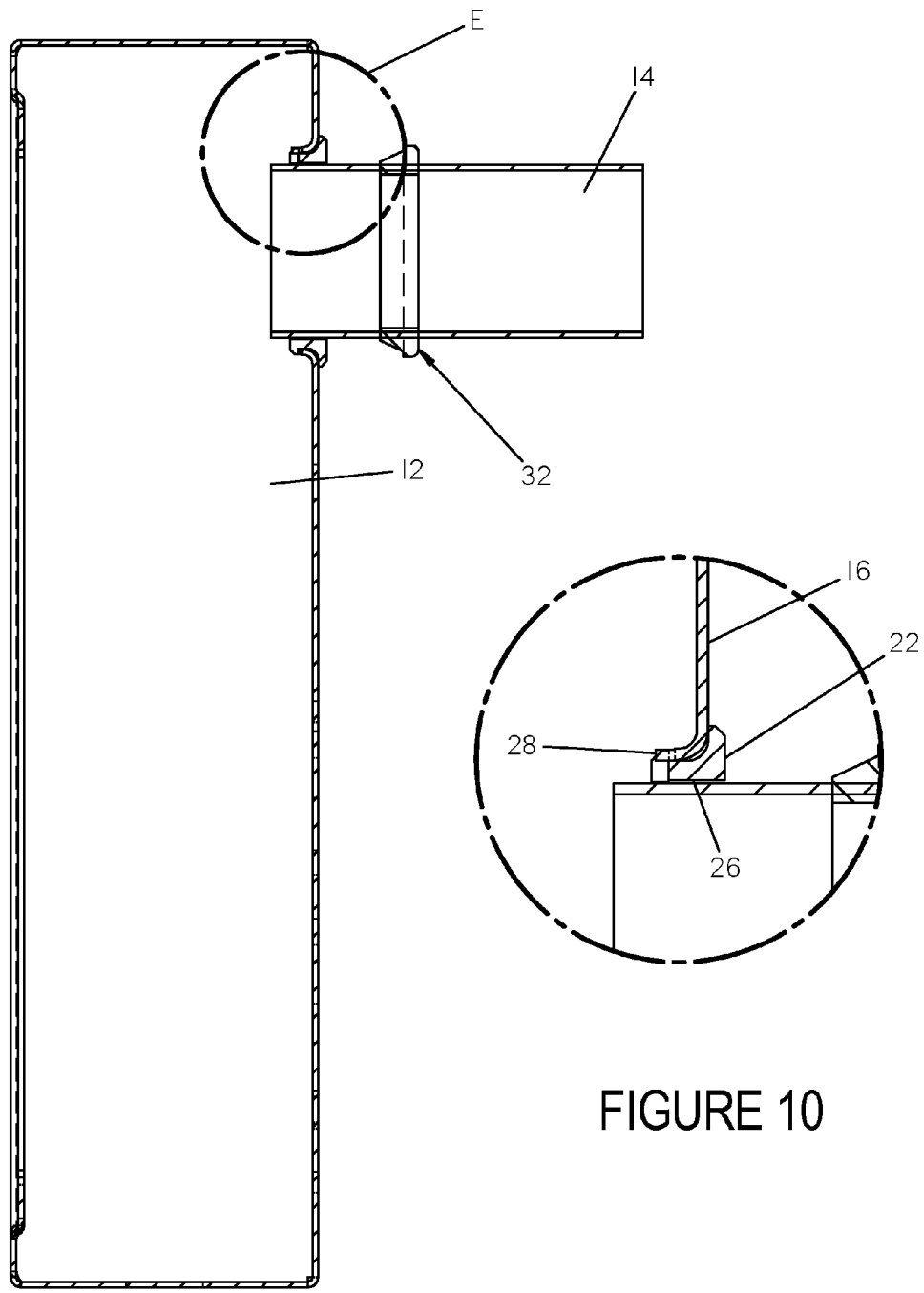
FIG. 9 is a top view of the roller grill bearing apparatus shown along Section line B-B as shown in FIG. 8.
FIG. 10 is detailed top view of the roller grill bearing apparatus in area E shown in FIG. 9.

As shown in FIGS. 6 through 13, bearing 10 provides a substantially greater width for land 33. Bearing land 33 now typically ranges from (3.556 millimeters to 4.064 millimeters) 0.140 inches to 0.160 inches. Also, sheet metal 16 is punched with a special die to cause the edge of sheet metal 16 to bend slightly inward as shown in FIG. 10. In this manner, the punched wall of sheet metal 16 fits on bearing land 33 as land 33 has a radius as shown in FIG. 6 that corresponds to the die cut edge of sheet metal 16 such that a sharp edge will not penetrate bearing 10.

The left side of bearing 10 is side 20 and the right side of bearing 10 is side 22. As with the prior art bearing, bearing 10 can be snapped into its' opening by hand. Notch 24 is provided to prevent bearing 10 from turning relative to roller tube 14. With invention 10, end housing tab 28 (See FIG. 10) fits into notch 24.

As with the prior art bearing 11, grease seal 32 is provided to protect bearing 10 from grease and food debris.

With these improvements, it is expected that the life span of bearing 10 will be substantially greater, perhaps double or triple than that of prior art bearings. Also, it is expected that failures from improper handling be can substantially reduced as well.

Although the present invention has been described with reference to certain preferred embodiments thereof, other versions are readily apparent to those of ordinary skill in the preferred embodiments contained herein.

What is claimed is:

1. A ring-shaped bearing assembly for a roller grill, said roller grill having a plurality of rollers, each roller having the same diameter and having first and second ends; and
    wherein each roller having a pair of said ring-shaped bearings made from soft plastic with one ring-shaped bearing of the pair at one end of said each roller and the other ring-shaped bearing of the pair at the other end of said each roller; and
    wherein said roller grill having left and right side sheet metal panels having a plane parallel to said panels and with each said panel having the same thickness; and
    wherein each said left and right side sheet metal panels having a plurality of paired punched openings having a diameter corresponding to the diameter of said rollers and having a sharp edge where it was punched; and
    wherein, each pair of punched openings having one pair of said ring-shaped bearings such that each pair of ring-shaped bearings is snap-fitted by hand into its corresponding pair of punched openings thus locking said ring-shaped bearing in place such that each roller is supported between said left and right side panels in order that each roller is able to rotate freely 360 degrees; said ring-shaped bearing assembly comprising:
    a ring-shaped bearing comprising:
        a first ring section having an outer diameter surface, such that said outer diameter surface corresponds to the diameter of its punched opening; and wherein said outer diameter surface having a wedge-shape to facilitate said circular bearing being snap fitted by hand into its punched opening; and
    wherein said first ring section also having an inner diameter surface to provide a first bearing surface for one end of one roller that is inserted therethrough;
        a second ring section having an outer diameter surface that is greater in diameter than the diameter of said first ring section; and
        wherein said second ring section also having an inner diameter surface to provide a second bearing surface such that it is in contact with same roller end that said first ring section is in contact; and
        a third ring section having an outer diameter arc surface that provides a bearing land; and
        wherein the thickness of said third ring section is greater than the thickness of said side panels; and
        wherein said third ring section is interposed between said first and said second ring sections in order to provide a channel for containing the sharp edge of said punched opening; and
        wherein said third ring section also having an inner diameter surface to provide a third bearing surface such that it is in contact with the same roller end that said first and second sections are in contact;
        a beveled support that is provided in each punched opening by using a die that causes the sheet metal of said side panels to be bent inward at a radiused surface that matches the radiused surface of said bearing land of said third ring section such that the sharp edge of said punched opening is facing inward at an angle to the plane of said side walls such that when said beveled support is positioned in the channel of said third ring section, the sharp edge of said punched opening is prevented from cutting into the plastic of said ring-shaped bearing.

2. The bearing assembly of claim 1 wherein said first, second and third sections of said ring-shaped bearing are integral with one another and formed from a single rod of soft plastic by machining.

3. The bearing assembly of claim 2 wherein the ring-shaped bearing is made from a fluoropolymer plastic material.

4. The bearing assembly of claim 1 further comprising:
    a notch in each ring-shaped bearing;
    an end housing tab in each punched opening such that when said notch is engaged by said housing tab of its corresponding notch in said ring-shaped bearing, said ring-shaped bearing is prevented from rotating when its corresponding roller rotates therein.

* * * * *